(12) United States Patent
Behmenburg et al.

(10) Patent No.: US 6,354,617 B1
(45) Date of Patent: Mar. 12, 2002

(54) LEVEL CONTROL FOR A VEHICLE HAVING AIR SPRINGS

(75) Inventors: Christoph Behmenburg; Uwe Folchert, both of Lauenau; Heinz Job, Neustadt; Helge Westerkamp, Hannover, all of (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/556,428

(22) Filed: Apr. 24, 2000

(30) Foreign Application Priority Data

Apr. 22, 1999 (DE) .......................................... 199 18 157

(51) Int. Cl.$^7$ ................................................. B60G 7/00
(52) U.S. Cl. ..................... 280/124.157; 280/124.158; 280/124.159; 280/124.16; 280/124.161; 137/100; 137/596.18; 137/627.5
(58) Field of Search .................. 280/124.157, 124.158, 280/124.159, 124.16, 124.161; 137/100, 596.18, 627.5

(56) References Cited

U.S. PATENT DOCUMENTS

| | | | | |
|---|---|---|---|---|
| 4,050,746 A | * | 9/1977 | Durling ................... | 137/627.5 |
| 4,565,067 A | * | 1/1986 | Tani et al. .............. | 137/596.18 |
| 5,340,203 A | * | 8/1994 | Gowda ................... | 280/124.16 |
| 5,458,403 A | * | 10/1995 | Moody ................... | 280/124.16 |
| 5,558,410 A | * | 9/1996 | Kanjo et al. ........... | 280/124.16 |
| 5,577,814 A | * | 11/1996 | Engelbert et al. ........ | 137/627.5 |
| 6,116,586 A | * | 9/2000 | Westerkamp et al. .. | 280/124.16 |
| 6,185,986 B1 | * | 2/2001 | Nelson et al. .............. | 137/100 |

* cited by examiner

Primary Examiner—Lanna Mai
Assistant Examiner—Toan C To
(74) Attorney, Agent, or Firm—Walter Ottesen

(57) ABSTRACT

The invention relates to a level control arrangement for vehicles having air springs (6a) to (6d) and a pneumatically controllable directional valve (26). A residual pressure holding function and an overpressure function are integrated into the directional valve (26). The directional valve (26) is controlled by the air pressure in the air springs (6a) to (6d). The air pressure can be applied via a control line (20) to a control input (24) of the directional valve (26). The air from the air springs (6a) to (6d) is released with the aid of the venting line (28). The venting line (28) is guided separately from the control line (20) through the directional valve (26). In this way, a large air flow can be conducted through the venting line (28) without the static air pressure in the control space (50) of the directional valve (26) being reduced. The venting line is blocked by a stepped piston (44) of the directional valve when no air is to be released from the air springs.

9 Claims, 4 Drawing Sheets

LEVEL CONTROL FOR A VEHICLE HAVING AIR SPRINGS

BACKGROUND OF THE INVENTION

Modern level control arrangements have an overpressure function and a residual pressure holding function. An overpressure function is understood to be a function wherein the air pressure source is connected to the atmosphere during filling of one of the air springs of the level control arrangement when the air pressure source exceeds a pregiven pumping pressure. In this way, it is ensured that no overpressure can be built up in the air springs which could damage the same. A residual pressure holding function is a function wherein each air spring of the level control arrangement can be deflated only to a specific pregiven residual pressure. In this way, it is ensured that the air pressure in the air springs does not drop below this pregiven residual pressure so that a specific support capability of the air spring is always retained.

A compressor is sold by WABCO (Westinghouse Fahrzeugbremsen GmbH) having the product number 415 403-1020 or 415 403-1040. This compressor has a pneumatically controllable first directional valve wherein the overpressure function and the residual pressure holding function are integrated. The overpressure function is ensured in that, when filling an air spring with the aid of the compressor, the second piston is charged by the air pressure of the compressor and opens to the atmosphere against the return spring force of the second spring when the compressor exceeds a pregiven pumping pressure. The compressor then communicates with the atmosphere and pumps only into the atmosphere.

To deflate an air spring, the first piston and the second piston are each lifted from their seats against the return force of the first spring and the return force of the second spring by the air pressure in the air spring and the air spring is then connected to the atmosphere. The return spring force of the first spring is so adjusted that this force presses the first piston back onto the seat when the residual pressure in the air spring is reached thereby blocking the connection of the air spring to the atmosphere. A further deflation of the air spring below the residual pressure is then no longer possible.

The pneumatically controllable directional valve is controlled for deflating an air spring as will be explained below.

A control line is conducted via a controllable additional directional valve disposed between the air springs and the pneumatically controllable directional valve. This control line is connected to the control chamber of the pneumatically controllable directional valve which then is charged with the air pressure of an air spring. As a consequence, the first piston and the second piston are lifted from their respective seats against the return forces of the first and second springs. The venting line is likewise guided via the controllable second directional valve into the control chamber. The control chamber includes an inlet opening into which the control line and the venting line open. In addition to the inlet opening, the control chamber includes an outlet opening from which the venting line extends and is connected to the air dryer of the level control arrangement. For venting an air spring, the air flows from the air spring through the controllable second directional valve and through the control chamber into the air dryer and, from there, into the atmosphere via an outlet of the pneumatic controllable directional valve.

The pneumatic controllable directional valve which is known from the compressor of WABCO, has a simple compact configuration but the overpressure function and the residual pressure function are integrated therein. It is, however, noted that, to deflate an air spring, there is a continuous flow through the control chamber of the pneumatically controllable directional valve. A throttle is provided in the outlet opening of the control chamber in order to avoid a large drop of the static air pressure in the control chamber. This throttle greatly reduces the flow speed of the air to be vented. For this purpose, the throttle has to have a very small flow cross section so that a rapid deflation of the air spring and therefore a desired rapid lowering of the vehicle (for example, when the vehicle is at standstill) is not possible.

SUMMARY OF THE INVENTION

It is an object of the invention to provide a level control arrangement having a pneumatically controllable directional valve which contains an overpressure function and a residual pressure holding function and which makes a rapid deflation or venting of the air springs possible.

The level control arrangement of the invention is for a vehicle and includes: a plurality of air springs mounted on the vehicle; a pressurized air source for supplying pressurized air; an air dryer connected to the pressurized air source; valve means for connecting the pressurized air source to the air springs via the air dryer for filling the air springs; a pneumatically controllable first directional valve for connecting the pressurized air source with the atmosphere when a pregiven pumping pressure is exceeded; a venting line providing a path via which the air springs can communicate with the atmosphere for releasing pressurized air thereinto from the air springs; the venting line being lead through the first directional valve and the air dryer; the first directional valve having a pneumatic control input; a control line leading to the pneumatic control input and being connectable to at least one of the air springs so as to permit the pneumatic control input to be charged with pressurized air of the at least one of the air springs; a controllable second directional valve connected in the control line between the first directional valve and the air springs and switchable to connect and disconnect the first directional valve from the air springs; the first directional valve including: a housing; a first piston displaceably mounted in the housing for movement between a first position and a second position and the first piston having a catch formed thereon; a first seat on which the first piston sits when in the first position; a first spring for resiliently biasing the first piston against the first seat in the first position; the first piston being liftable from the first seat against the return force of the first spring when the pneumatic control input is charged with the air pressure of at least one of the air springs; a second seat connectable to the atmosphere; a second piston displaceably mounted in the housing; a second spring for resiliently biasing the second piston against the second seat for blocking a connection to the atmosphere via the second seat; the second piston being operatively connected to the first piston and having an end face chargeable with pressurized air from the pressurized air source and from the venting line; the second piston being lifted from the second seat against the return force of the second spring via the catch when the first piston is lifted from the first seat or by the pressurized air from the pressurized air source when the pressurized air from the pressurized air source exceeds a pregiven pumping pressure and then at least one of the air springs and/or the pressurized air source is connected with the atmosphere; the venting line being guided through the first directional valve separately from the control line; and, the venting line being blocked by the first piston when the first piston is seated on the first valve seat and cleared when the first piston has lifted from the first seat so that air from at least one of the air springs can be discharged into the atmosphere.

The advantages achieved with the invention are especially that a rapid deflation of the air spring is possible via the pneumatically controllable directional valve because the venting line is guided through the directional valve separately from the control line and therefore a throttle to reduce the flow velocity in the venting line to maintain the static air pressure in the control line or in the control chamber is not necessary.

A further advantage of the invention will be understood when one considers that, in the basic state of the control system (that is, when the air springs are neither filled nor deflated), the air springs should be separated from the air dryer so that no air from the air springs can flow to the air dryer. In this case, it is possible to arrange a pressure sensor between the air springs and the air dryer with which every air spring can be connected for pressure measurement without air flowing out of the air spring into the air dryer which would lead to an unwanted pressure loss in the air spring.

The separation of the air springs from the air dryer is achieved in accordance with the invention in that the venting line is blocked in the pneumatically controllable first directional valve by the first piston when this piston is disposed on its seat. Because of this situation, the venting line is guided directly from the air springs to the pneumatically controllable first directional valve without passing through the second controllable directional valve. In this way, a rapid deflation of only two or more air springs of the level control arrangement is possible simultaneously because a large air flow can be guided through the pneumatically controllable first directional valve. (This is in contrast to the level control arrangement known from WABCO, wherein the venting line is guided via the second controllable directional valve in order to separate the air springs from the air dryer in the basic state of the level control arrangement. The second directional valve is an electrically controllable directional valve so that only small flow cross sections can be switched therein. For this reason, a rapid simultaneous deflation of the two or more air springs is not possible.)

According to another embodiment of the invention, the first directional valve includes a space formed therein into which the first piston at least partially plunges. The venting line has two component lines having respective first ends defining respective openings which open into the space; and, at least one of the openings is closed by the first piston when the piston is seated on the first seat and both of the openings are open when the first piston has lifted from the first seat so that both of the component lines are connected to each other via the space.

The advantage of this embodiment is that at least one outlet opening is closed by the seating of the first piston on the opening and can be opened by lifting the piston. In this way, a pneumatically controllable directional valve in accordance with the first embodiment of the invention is easy to produce.

According to another feature of the invention, at least one of the component lines opens into the seal seat on which the first piston sits. The first piston is held on the seal seat by the first spring. The advantage of this embodiment is that a reliable interruption of the venting line is achieved by the configuration of the seal seat when the air springs are not to be deflated.

According to another feature of the invention, the space can be an annular space or it can be a bore in the housing of the pneumatically controllable directional valve. The configuration of the space as a small area bore into which the first piston at least partially plunges affords the advantage that the area of the piston which the air passes by when deflating an air spring is especially small (the area corresponds to only the small area of the bore). For this reason, a precise control of the pneumatically controllable first directional valve via the pneumatic control input by means of the air flow in the venting line is only affected by a negligible amount. This will be explained in greater detail in the detailed description of the preferred embodiments.

In another embodiment of the invention, the first piston has a surface and defines a longitudinal axis. The housing has an inner wall adjacent the surface of the first piston and the inner wall is configured to axially guide the first piston in the housing. The venting line has two component lines lying in spaced relationship to each other with the spacing therebetween being in the direction of the longitudinal axis. The component lines have respective first ends defining respective openings which open at the surface of the first piston. The inner wall and the surface of the first piston conjointly define an interface. The first directional valve further includes a seal mounted at the interface and the seal is operatively connected to the first piston so that a connection between the component lines along the interface is blocked when the first piston is in the first position and the connection is cleared when the first piston has lifted off the first seat.

The advantage of this embodiment is that no force is applied to the first piston because of the air pressure in the venting line which force operates in the axial direction of the piston and could lift the piston from its seat so that a precise control of the pneumatically controllable first directional valve takes place exclusively via the pneumatic control input of this directional valve.

According to another embodiment of the invention, the first piston includes a slot in which an O-ring is arranged. The slot lies between the two component lines and is radially pressed between the first piston and the housing wall when the piston is disposed on its seat and lies above or below the component lines when the first piston is lifted from its seat. The advantage of this further embodiment is that the pneumatically controllable first directional valve can be manufactured in a simple manner.

According to another embodiment of the invention, the venting line includes a throttle which is mounted between the air springs and the air dryer. The advantage of this further embodiment is that the air, which is released from an air spring of the level control arrangement, is slowed by the throttle so that an especially good regeneration of the air dryer is possible. It has been shown that even one throttle having a flow cross section of 1 mm to 2 mm satisfies this function.

Preferably, the throttle is mounted in the venting line in such a manner that the air flows through this throttle exclusively during deflation or venting of an air spring. The advantage of this further embodiment is that there is no flow through the throttle during filling of an air spring and so the filling operation is not hindered. The throttle can, for example, lie in the region wherein the venting line is guided into the pneumatically controllable first directional valve in order to satisfy the above-mentioned conditions.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
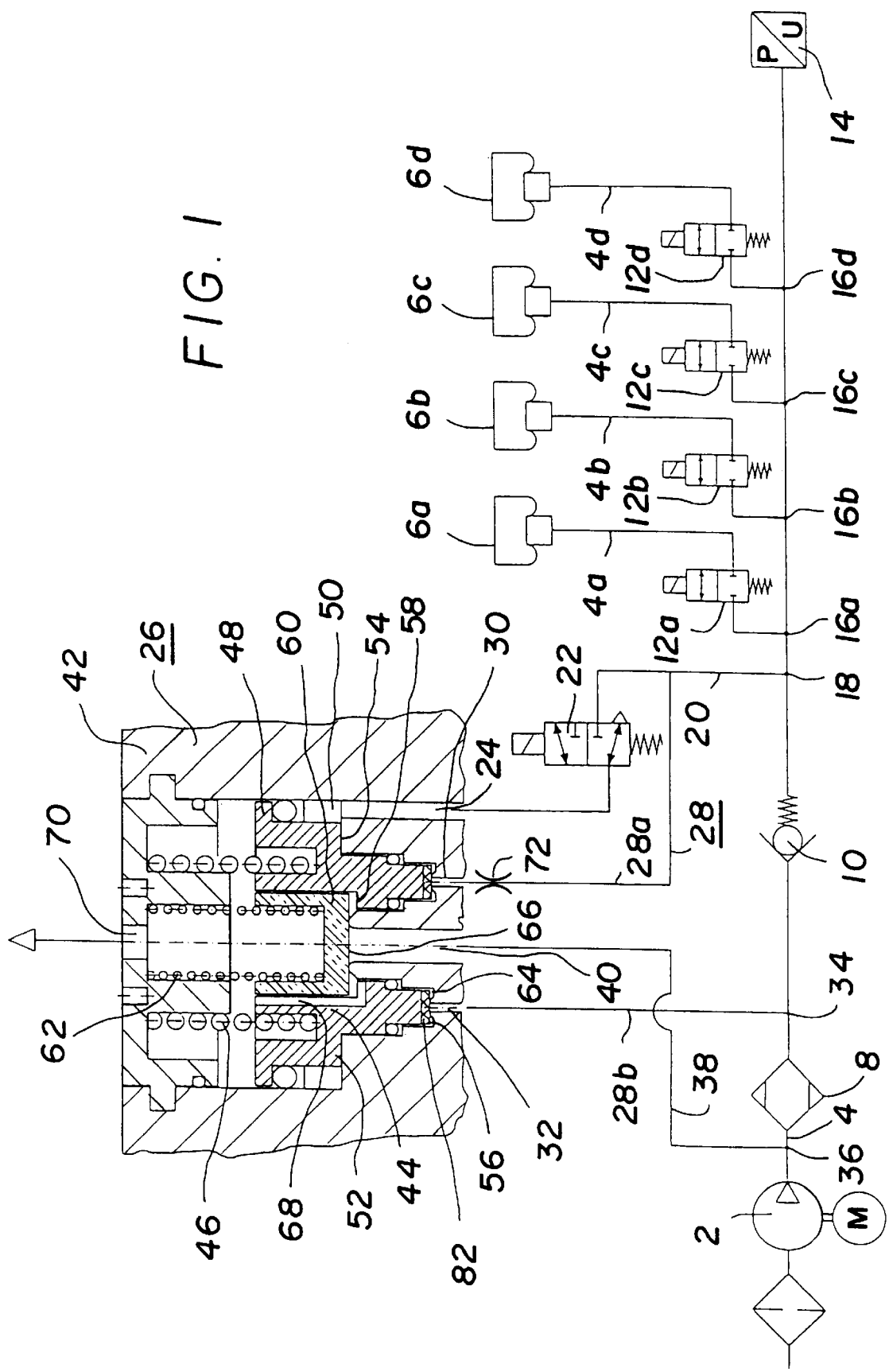
FIG. 1 is a schematic of a level control arrangement according to a first embodiment of the invention.

FIG. 1 shows a level control arrangement which includes a pressurized air source in the form of a compressor 2 which is connected via a pressurized air line 4 to the air springs 6a to 6d. The pressurized air line 4 proceeds from the compressor 2 via an air dryer 8 and a check valve 10 which opens to the air springs 6a to 6d. Pressurized air lines 4a to 4d branch away from pressurized air line 4 behind the check valve 10 viewed from the air dryer 8. The pressurized air lines 4a to 4d lead to corresponding ones of the air springs 6a to 6d. Each of the pressurized air lines 4a to 4d includes an electrically controllable 2/2 directional valve 12a to 12d with which the pressurized air lines 4a to 4d can be blocked or cleared. The pressurized air line 4 is also connected to the pressure sensor 14 rearward of the check valve 10 (as viewed from the air dryer 8). The function of the pressure sensor 14 will be explained hereinafter.

A branching point 18 is disposed between the check valve 10 and the branch points 16a to 16d whereat the pressurized air lines 4a to 4d branch away from the pressurized air line 4. A control line 20 branches away from the pressurized air line 4 at branching point 18 and leads to the control input 24 of the pneumatically controllable directional valve 26 via an electrically controllable 3/2 directional valve 22. The electrically controllable valve 22 is characterized in the introduction herein as a controllable second directional valve. This directional valve 22 connects the control input to the atmosphere in the basic state shown in FIG. 1 and clears the control line 20 in the second switching state. Furthermore, a venting line 28 branches from the pressurized air line 4 between the check valve 10 and the branching points 16a to 16d. The first component line 28a of the venting line 28 opens into the inlet opening 30 of the pneumatically controllable directional valve. The second component 28b of the venting line 28 again exits from the pneumatically controllable directional valve 26 in the outlet opening 32. Starting from the outlet opening 32, the component line 28b leads to the pressurized air line 4 at a point 34. The point 34 lies between the air dryer 8 and the check valve 10.

A further pressurized air line 38 branches from the pressurized air line 4 at point 36 between the compressor 2 and the air dryer 8. The pressurized air line 38 leads from point 36 to an outlet 40 of the pneumatically controllable directional valve 26. The pressurized air line 38 connects either the air springs 6a to 6d via the venting line 28 or the compressor 2 to the atmosphere. How this is done will be explained hereinafter.

In the following, the assembly of the pneumatically controllable directional valve 26 will be explained in detail.

The pneumatically controllable directional valve 26 includes a housing 42 wherein a first piston is mounted. The first piston is in the form of a preferably rotational symmetrically stepped piston 44. The stepped piston 44 is biased by a first spring 46 and is mounted so as to be axially movable in the housing 42 against the return force. The stepped piston 44 is guided by a cylinder wall of the housing 42. An annular space 50 is located below the first step 48 of the stepped piston 44 and the control input 24 of the pneumatically controllable directional valve 26 opens into this annular space. The stepped piston 44 preferably seats with a second step 52 on a seat 54 of the housing 42. In addition to the first annular space 50, the housing 42 of the pneumatically controllable directional valve 26 has a second annular space 56 wherein the inlet opening 30 as well as the outlet opening 32 of the venting line 28 open. The stepped piston 44 projects into the second annular space 56 and seals the inlet opening 30 and the outlet opening 32 of the venting line 28 with an annular seal toward the annular space 56 when the stepped piston is located on its seat 54 as shown in FIG. 1. In addition to the components mentioned above, the stepped piston 44 also includes a catch 58 whose function will be explained also hereinafter.

In addition to the stepped piston 44, the pneumatically controllable directional valve 26 includes a preferably rotational symmetrical axially movable second piston 60 which is mounted coaxially to the stepped piston 34 and is enclosed by the latter. The second piston 60 is axially guided by the inner wall of the stepped piston 44 and is held by a second spring 62 on a seal seat 64. The end face 66 of the second piston 60 blocks the outlet 40 of the pneumatically controllable directional valve 26 when the second piston 60 is located on its seal seat. If, in contrast, the second piston 60 is lifted from its seal seat against the return force of the second spring 62, then the second piston 60 clears a connection of the outlet 40 to the atmosphere via a channel 68 and via an outlet opening 70 in the housing 42. The channel 68 extends between the stepped piston 44 and the second piston 60.

It will now be explained how the air spring 6a can be filled with pressurized air by the compressor 2. First, a control unit (not shown) outputs a signal to the control input of the electrically controllable 2/2 directional valve 12a so that this valve transfers from the base position shown in FIG. 1 to its other switching position wherein the pressurized air line 4a is cleared. Thereafter, the compressor starts running and pumps pressurized air into the air spring 6a via the air dryer 8, the check valve 10 and the 2/2 directional valve 12a. The pressurized air, which is pumped by the compressor 2, is applied via the pressurized air line 38 also to the end face 66 of the second piston 60. If a pregiven pumping pressure by the compressor 2 is exceeded when filling the air spring 6a, then the second piston 60 lifts from its seal seat 64 against the return force of the second spring 62 so that the pressurized air line 38 is then connected via the channel 68 and the outlet opening 70 with the atmosphere. The compressor 2 then no longer pumps into the air spring 6a but only into the atmosphere. In this way, it is ensured that the air spring 6a cannot be filled with pressurized air beyond a pregiven air pressure (overpressure function). The same corresponds to the filling of the air springs 6b to 6d.

It will now be explained how the air spring 6a can be deflated. For this purpose, the 2/2 directional valve 12a is first transferred into its other switching position from the base position shown in FIG. 1 so that the pressurized air line 4a is cleared. Furthermore, a control signal is likewise outputted from the control unit (not shown) to the control input of the electrically controllable 3/2 directional valve 22 so that this valve is transferred from the base condition shown in FIG. 1 to its other switching position. In its base condition, the control input 24 is connected to the atmosphere and in its other switching position, the control line 20 is cleared. After the switchover of the directional valves 12a and 22 into the other switching condition, pressurized air can flow from the air spring 6a, through the pressurized air line 4a and through the control line 20 via the control input 24 into the first annular space 50. After a short time, the same air pressure is present in the first annular space 50 as in the air spring 6a.

Because of the air pressure in the first annular space 50 (which air pressure operates on the first step 48 of the stepped piston 44), the stepped piston 44 is lifted from its seat 54 against the return force of the first spring 46. After lifting, the air pressure in the annular space 50 operates on the end face of the first step 48 as well as on the end face of the second step 52 of the first stepped piston 44 so that the force, which operates on the first stepped piston 44, is correspondingly increased. This force is large enough to entrain and lift the second piston 60 from its seal seat with the aid of the catch 58 against the return force of the second spring 62 so that the second piston 60 clears the connection to the atmosphere.

Furthermore, the stepped piston 44 is lifted from the seal seat of the inlet opening 30 or the outlet opening 32 whereby these are opened. As a consequence, the first component line 28a is connected to the second component line 28b via the second annular space 56. Now air can flow into the atmosphere from the air spring 6a via the following: the pressurized air line 4a, the first component line 28a, the annular space 56, the second component line 28b, the air dryer 8 and the pressurized air line 38 (the pressurized air line 38 in this case is also part of the venting line), the channel 68 and through the outlet opening 70.

When the air pressure in the air spring 6a reaches a pregiven residual pressure, then the air pressure in the first annular space 50 drops to this residual pressure and the stepped piston 44 is pressed onto its seat 54 by the return force of the first spring 46. Furthermore, the second piston 60 is pressed by the return force of the second spring 62 onto its seal seat. When the residual pressure is reached, the connection of the air spring 6a is blocked (residual pressure holding function).

If the deflation of the air spring 6a is to be ended in a targeted manner, then the valves 12a and 22 are transferred by the control unit into the base position shown in FIG. 1. The control input 24 of the pneumatically controllable directional valve 26 is then connected via the 3/2 directional valve 22 with the atmosphere so that the air pressure, which is present in the first annular space 50, drops to atmospheric pressure. The stepped piston 44 is then pressed by the return force of the first spring 46 onto its seat 54 and the second piston 60 is then pressed onto its seal seat in opposition to the return force of the second spring 62. The connection of the air spring 6a to the atmosphere is then interrupted and the air spring 6a cannot be further deflated because the component lines 28a and 28b are no longer connected to each other via the second annular space 56. The air springs 6b to 6d are deflated in a corresponding manner.

It is likewise possible to deflate two or more air springs 6a to 6d simultaneously. The corresponding directional valves 12a to 12d assigned to corresponding air springs 6a to 6d are then to be transferred from the base position into their other switching position. By simultaneously deflating several air springs 6a to 6d, the level control arrangement according to the invention affords the advantage that the total air flow, which is made up of the individual air flows from the air springs 6a to 6d, is guided exclusively via the pneumatically controllable directional valve 26. Large flow cross sections can be switched on this pneumatically controllable directional valve 26. For this reason, a rapid throughflow of the directional valve 26 is also ensured when several air springs 6a to 6d are to be deflated simultaneously. In this way, a rapid deflation of several air springs simultaneously is possible.

In the first component line 28a of the venting line 28, a throttle 72 is preferably provided with which the pressurized air, which is located in an air spring 6a to 6d is slowed before the entry into the air dryer. In this way, an especially good regeneration of the air dryer 8 is obtained.

In the following, it will be explained how, with the aid of the pressure sensor 14, the air pressure in the air spring 6a can be measured. For this purpose, the 2/2 directional valve 12a is transferred from the base position shown in FIG. 1 into the other switching position. The air pressure of the air spring 6a is then present in the pressurized air lines 4a and 4 and therefore on the pressure sensor 14 so that this air pressure can be measured with the aid of the pressure sensor 14. No air can flow off into the air dryer 8 via the check valve 10 when the pressurized air is measured in the air spring 6a because the check valve 10 is closed toward the air dryer. Furthermore, no air can flow into the air dryer 8 from the air spring 6a via the pneumatically controllable directional valve 26 because the 3/2 directional valve 22 is in the base position and the control line 20 is blocked so that the annular space 50 is not charged with pressurized air. Furthermore, the area, which is made available by the inlet opening 30 is not sufficient, with the aid of the air pressure in the air spring 6a, to lift the stepped piston 44 from its seat 54 against the return force of the first spring 46. The venting line 28 then remains blocked by the stepped piston 44 of the pneumatically controllable directional valve 26 and no air can flow into the air dryer 8. The air pressure measurement with the aid of the pressure sensor 14 is not made incorrect by an outflow of pressurized air and an accompanying pressure drop in the air spring 6a. The air pressure in the air springs 6b to 6d can be measured in a corresponding way.

Figure 2:
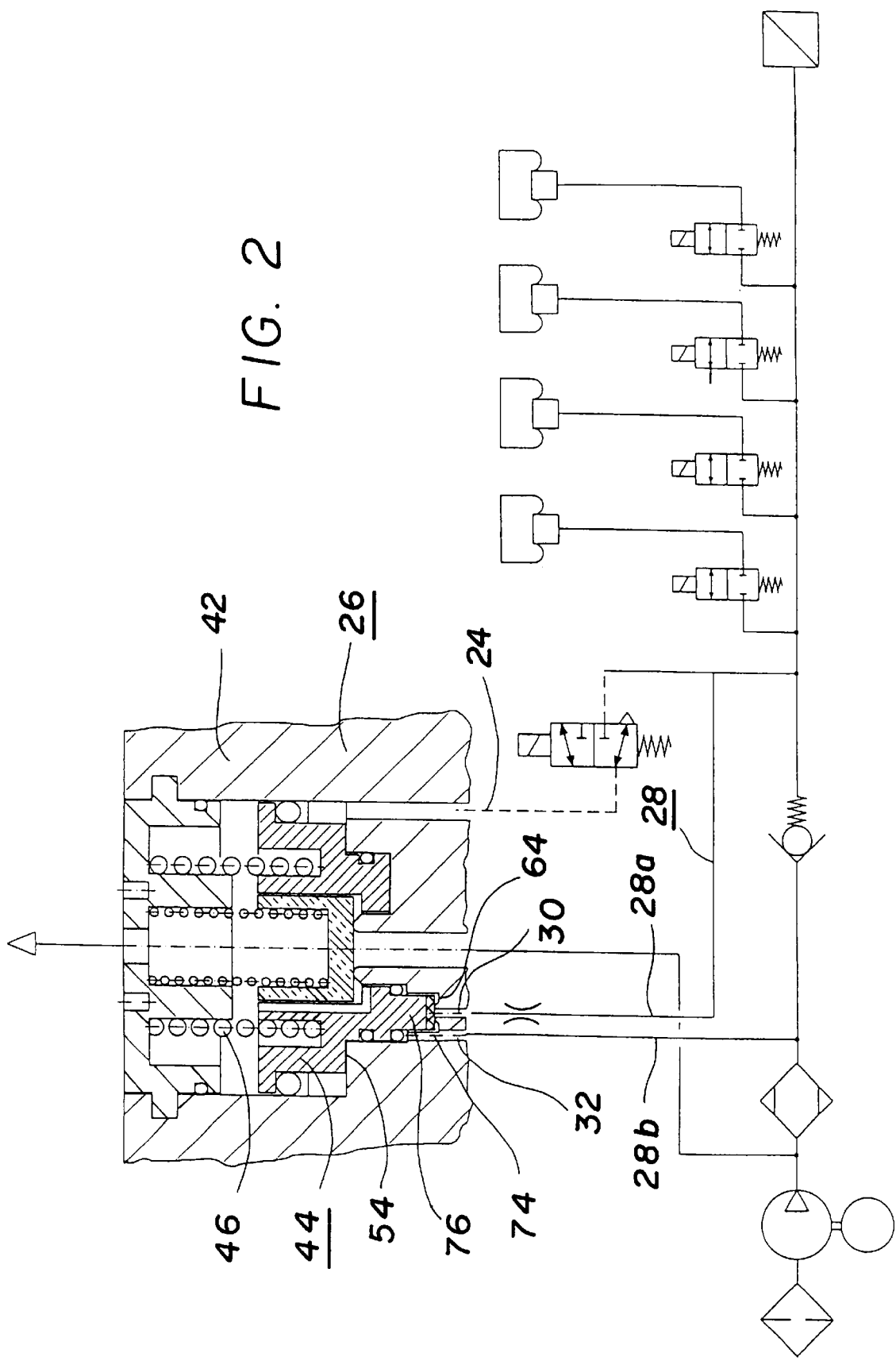
FIG. 2 is a schematic of a level control arrangement according to a second embodiment of the invention.

FIG. 2 shows a level control arrangement which corresponds substantially to the arrangement shown in FIG. 1. Furthermore, the function of the level control arrangement of FIG. 2 is identical to the function of the arrangement shown in FIG. 1 so that reference can be made to the description of FIG. 1. A difference between the arrangements of FIGS. 1 and 2 is only in the assembly of the pneumatically controllable directional valve 26.

In the pneumatically controllable directional valve 26 of FIG. 2, the inlet opening 30 and outlet opening 32 lie in a bore 74 of the housing 42 which preferably has an annularly-shaped base surface. The first component line 28a of the venting line 28 opens into the inlet opening 30 and the second component line 28b of the venting line 28 opens into the outlet opening 32. A preferably rotational-symmetrical extension 76 of the stepped piston 44 projects into the bore 74. The extension 76 substantially fills out the bore 74 when the stepped piston 44 is on its seat 54. The inlet opening 30 of the first component line 28a opens into a seal seat 84 on which the extension 76 of the stepped piston 44 seats and is held there by the return force of the first spring 46 when the stepped piston 44 is on its seat 54. When the stepped piston 44 lifts from its seat 54 against the return force of the first spring 46 as shown in FIG. 1, the extension 76 also lifts from the seal seat 64 and both component lines 28a and 28b are connected to each other via the bore 74. Air can then be released into the atmosphere from one or several air springs of the level control arrangement. In this connection, reference is made to the description corresponding to FIG. 1.

The base surface of the bore is configured so as to have an area as small as possible and at least significantly less than the annular surface of the annular space 56 into which the openings 30 and 32 open for the pneumatically controllable directional valve 26 in accordance with FIG. 1. For this reason, the force which is applied to the stepped piston 44 when there is a throughflow of the bore 74 is significantly less than the force which is applied to the stepped piston 44 when there is a throughflow of the annular space 56 when air is vented from one or several air springs. With the pneumatically controllable directional valve 26 shown in FIG. 2, the exact control possibility via the control input 24 with the aid of the static air pressure in the air springs is therefore clearly less influenced than in the pneumatically controllable directional valve 26 shown in FIG. 1.

Figure 3A:
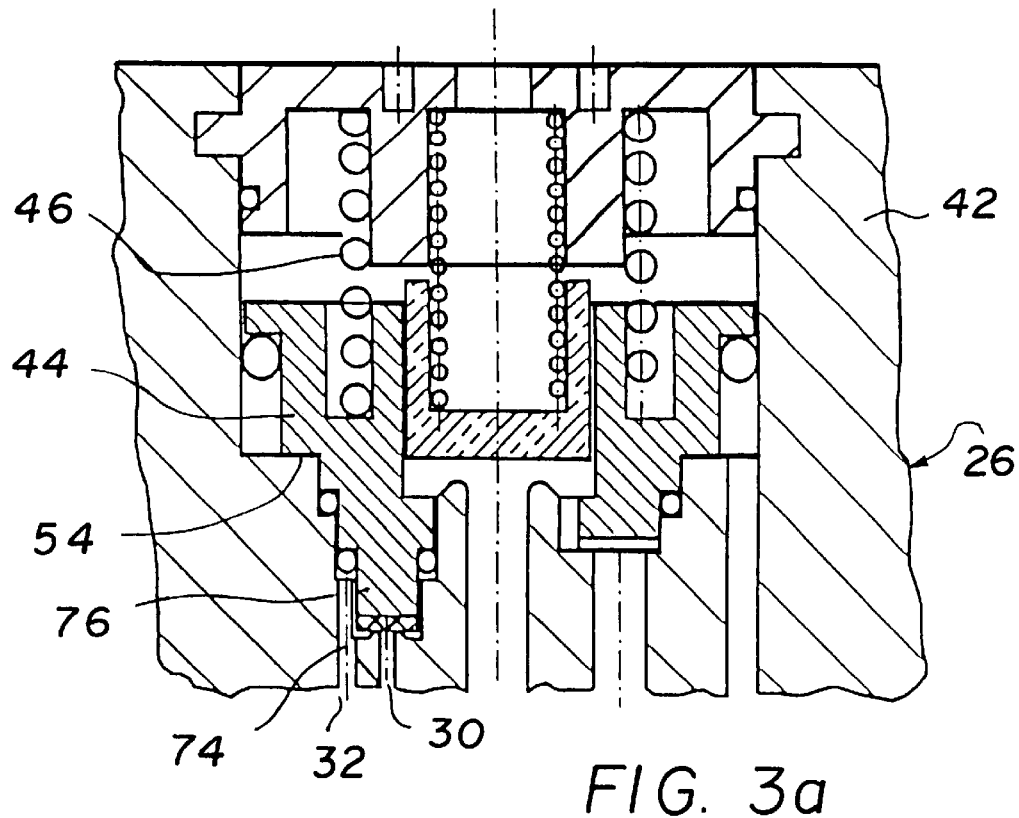
FIG. 3a is a detail view, in section, of the pneumatically controllable directional valve of FIG. 2 shown in the switching state wherein it connects the compressor to the atmosphere (overpressure function)
Figure 3B:
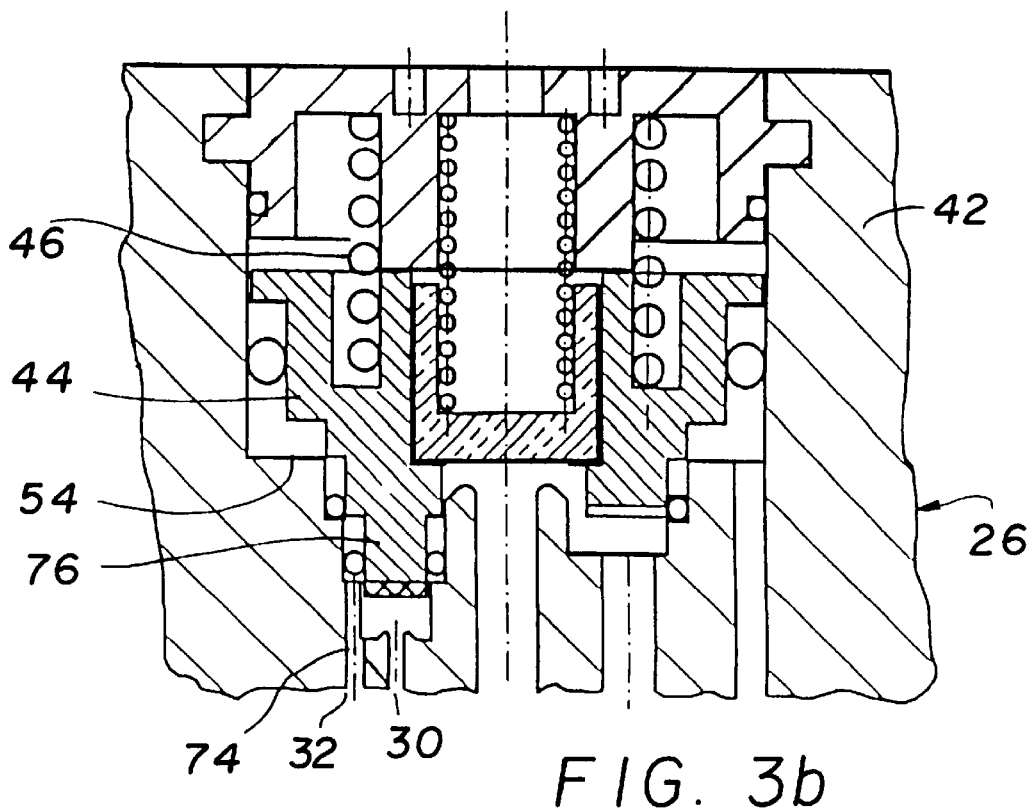
FIG. 3b is a detail view, in section, of the pneumatically controllable directional valve of FIG. 2 in the switching state wherein it connects one or more air springs for deflation to the atmosphere; and, FIG. 4 is a detail view, in section, of a pneumatically controllable directional valve wherein the component lines of the venting line are conducted through the housing laterally to the surface of the stepped piston.

FIG. 3a shows the pneumatically controllable directional valve 26 of FIG. 2 in the switching state in which the compressor is connected to the atmosphere (overpressure function). FIG. 3b shows the pneumatically controllable directional valve 26 of FIG. 2 in the switching state wherein one or several air springs are connected to the atmosphere for deflation.

Figure 4:
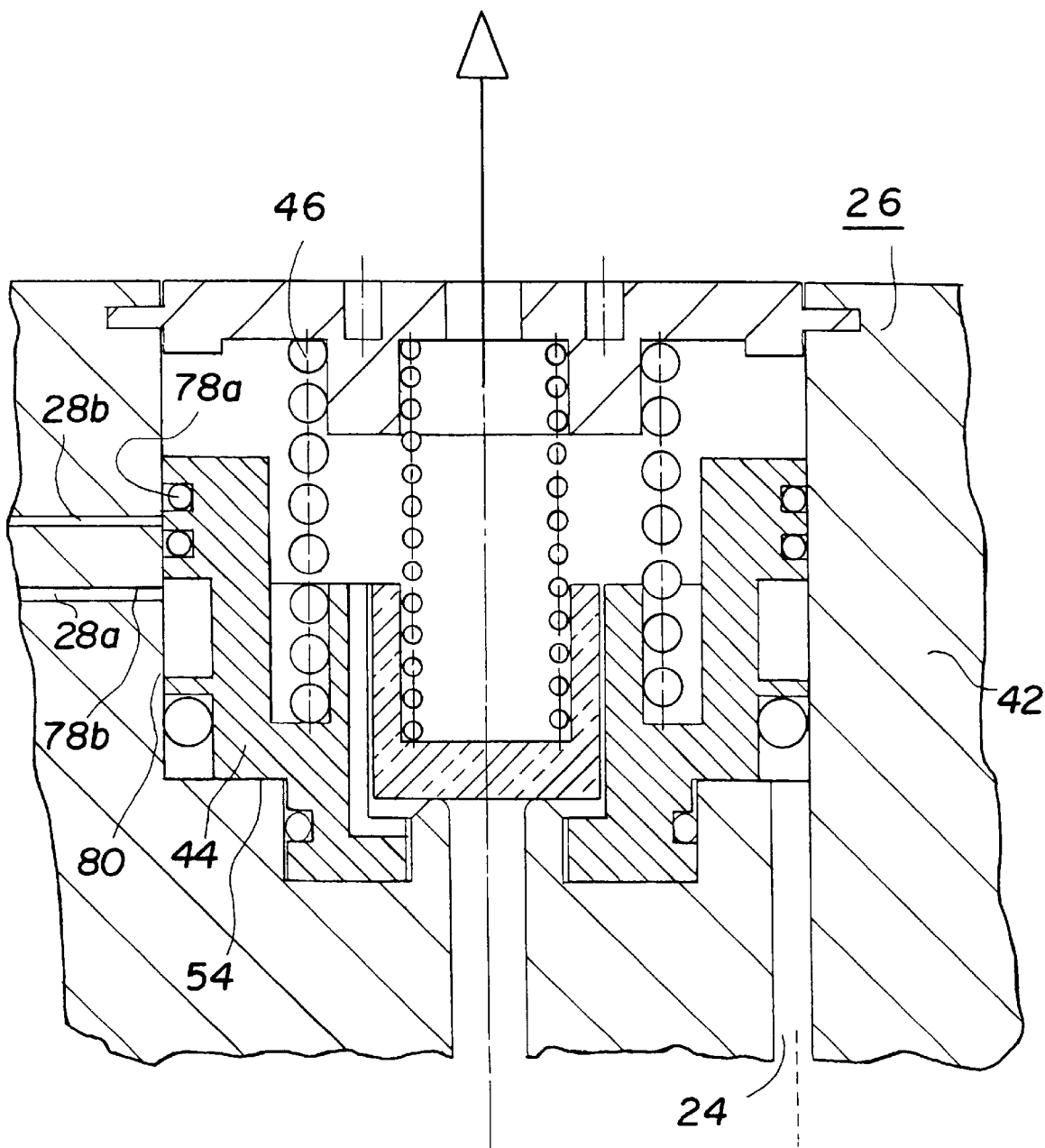

FIG. 4 shows a pneumatically controllable directional valve 26 wherein the component lines 28a and 28b of the venting line 28 are laterally guided through the housing 42 to the surface of the stepped piston 44 so that they open on the surface spaced from each other in the axial direction of the stepped piston 44. The stepped piston 44 contains two slots wherein respective O-rings 78a and 78b lie. When the first stepped piston 44 is on its seat 54, the first O-ring 78a is above the component line 28b and the O-ring 78b lies between the component lines 28a and 28b. Each O-ring is pressed radially between the stepped piston 44 and the housing wall of the housing 42 so that neither air from the component line 28a can reach into the other component line 28b nor air from one of the component lines can reach above or below the stepped piston 44.

If the stepped piston 44 is lifted from its seat 54 against the return force of the first spring 46, then the O-rings 78a and 78b are taken along so that the O-ring 78b lies above the component line 28b. The two component lines 28a and 28b are then connected to each other via an annular slot 80 in the surface of the stepped piston 44 so that air from the component line 28a can flow into the component line 28b and so that one or several of the air springs of the level control arrangement can be connected to the atmosphere. In this connection, reference can also be made to the description associated with FIG. 1.

The pneumatically controllable directional valve 26 of FIG. 4 affords the advantage that in no state of the level control arrangement a resulting force is applied to the stepped piston 44 because of the pressurized air in the component lines 28a and 28b. The resulting force acts opposite to the return force of the first spring 46. In this way, the control of the pneumatically controllable directional valve 26 is not influenced via the control input 24 by the air pressure in the venting line 28.

It is understood that the foregoing description is that of the preferred embodiments of the invention and that various changes and modifications may be made thereto without departing from the spirit and scope of the invention as defined in the appended claims.

What is claimed is:

1. A level control arrangement for a vehicle comprising:
a plurality of air springs mounted on said vehicle;
a pressurized air source for supplying pressurized air;
an air dryer connected to said pressurized air source;
valve means for connecting said pressurized air source to said air springs via said air dryer for filling said air springs;
a pneumatically controllable first directional valve for connecting said pressurized air source with the atmosphere when a pregiven pumping pressure is exceeded;
a venting line providing a path via which said air springs can communicate with the atmosphere for releasing pressurized air thereinto from said air springs;
said venting line being lead through said first directional valve and said air dryer;
said first directional valve having a pneumatic control input;
a control line leading to said pneumatic control input and being connectable to at least one of said air springs so as to permit said pneumatic control input to be charged with pressurized air of said at least one of said air springs;
a controllable second directional valve connected in said control line between said first directional valve and said air springs and switchable to connect and disconnect said first directional valve from said air springs;
said first directional valve including:
 a housing;
 a first piston displaceably mounted in said housing for movement between a first position and a second position and said first piston having a catch formed thereon;
 a first seat on which said first piston sits when in said first position;
 a first spring for resiliently biasing said first piston against said first seat in said first position;
 said first piston being liftable from said first seat against the return force of said first spring when said pneumatic control input is charged with the air pressure of at least one of said air springs;
 a second seat connectable to the atmosphere;
 a second piston displaceably mounted in said housing;
 a second spring for resiliently biasing said second piston against said second seat for blocking a connection to the atmosphere via said second seat;
 said second piston being operatively connected to said first piston and having an end face chargeable with pressurized air from said pressurized air source and from said venting line;
 said second piston being lifted from said second seat against the return force of said second spring via said catch when said first piston is lifted from said first seat or by the pressurized air from said pressurized air source when said pressurized air from said pressurized air source exceeds a pregiven pumping pressure and then at least one of said air springs and/or said pressurized air source is connected with the atmosphere;
 said venting line being guided through said first directional valve separately from said control line; and,
 said venting line being blocked by said first piston when said first piston is seated on said first valve seat and cleared when said first piston has lifted from said first seat so that air from at least one of said air springs are discharged into the atmosphere.

2. The level control arrangement of claim 1, said first directional valve including a space formed therein into which said first piston at least partially plunges; said venting line having two component lines having respective first ends defining respective openings which open into said space; and, at least one of said openings being closed by said first piston when said piston is seated on said first seat and both of said openings being open when said first piston has lifted from said first seat so that both of said component lines are connected to each other via said space.

3. The level control arrangement of claim 2, said first directional valve including a third seat in said housing; at least one of said component lines opening into said third seat; and, said first piston being resiliently biased on said third seat by said first spring.

4. The level control arrangement of claim 2, wherein said space is an annular space formed in said housing.

5. The level control arrangement of claim 2, wherein said space is a bore formed in said housing.

6. The level control arrangement of claim 1, said first piston having a surface and defining a longitudinal axis; said housing having an inner wall adjacent said surface of said first piston and said inner wall being configured to axially guide said first piston in said housing; said venting line having two component lines lying in spaced relationship to each other with the spacing therebetween being in the direction of said longitudinal axis; said component lines having respective first ends defining respective openings which open at said surface of said first piston; said inner wall and said surface of said first piston conjointly defining an interface; and, said first directional valve further including a seal mounted at said interface and being operatively connected to said first piston so that a connection between said component lines along said interface is blocked when said first piston is in said first position and said connection is cleared when said first piston has lifted off said first seat.

7. The level control arrangement of claim 6, said first piston having a slot formed therein at said interface and said seal being an O-ring seal mounted in said slot; and, said slot being disposed between said component lines and said O-ring being radially pressed between said inner wall and said surface of said first piston when said first piston is in said first position; and, said O-ring being above or below both of said component lines when said first piston has lifted off said first seat.

8. The level control arrangement of claim 1, further comprising a throttle mounted in said venting line between said air springs and said air dryer.

9. The level control arrangement of claim 8, said throttle being mounted so that air flows exclusively therethrough during venting of at least one of said air springs.

* * * * *